Dec. 29, 1936. H. A. KNOX ET AL 2,065,532
SUSPENSION FOR VEHICLES
Filed Sept. 30, 1935
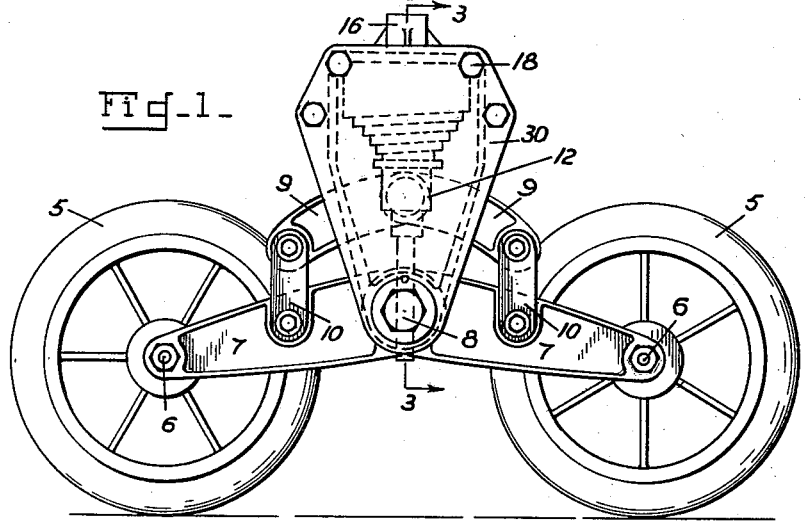
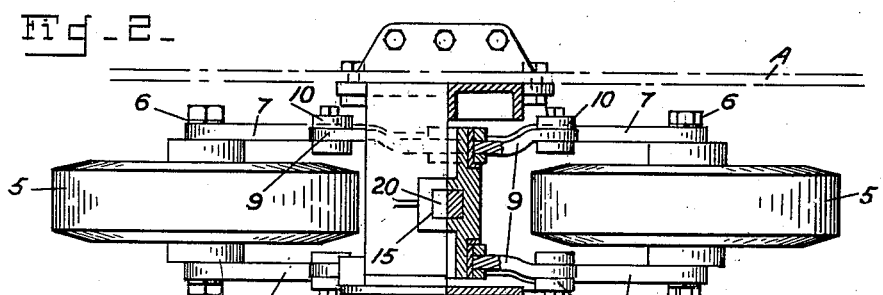
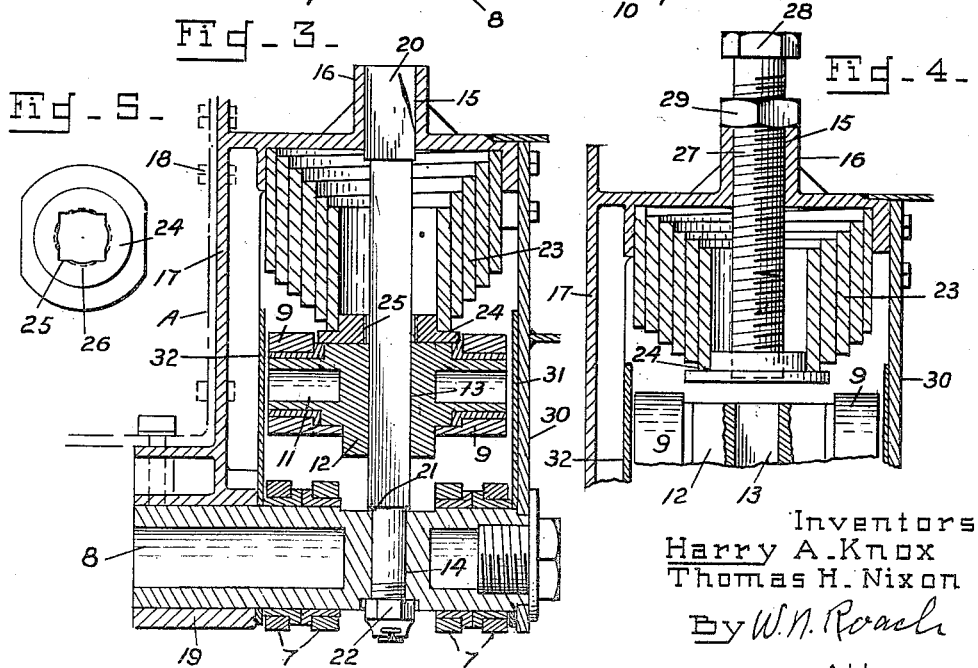
Inventors
Harry A. Knox
Thomas H. Nixon
By W. N. Roach
Attorney Patented Dec. 29, 1936

2,065,532

UNITED STATES PATENT OFFICE 2,065,532

SUSPENSION FOR VEHICLES

Harry A. Knox, Washington, D. C., and Thomas Hay Nixon, United States Army, Gettysburg, Pa.

Application September 30, 1935, Serial No. 42,864

5 Claims. (Cl. 305—9)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a suspension for vehicles and is an improvement on the suspension of our earlier Patent No. 1,947,475 of February 20, 1934.

In the patent a pair of independently mounted arms carrying wheels are associated through a linkage whereby a single spring is employed to yieldingly connect the arms to a vehicle body through a guide rod. In that arrangement the entire load was transmitted through the guide rod which became bent or broken and the linkage was subject to a twisting action which produced excessive wear and consequent looseness.

In order to eliminate these disadvantages it is proposed in the present invention to arrange the guide rod so that it is fixed in the load member and is capable of preventing twisting of the linkage.

A further object of the invention is to arrange the guide rod so that it may be replaced by special apparatus for holding the spring during application or removal of the wheel unit.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of the improved suspension unit.

Fig. 2 is a plan view partly in section.

Fig. 3 is a sectional view on the line 3—3 of Fig. 1.

Fig. 4 is a fragmentary view similar to Fig. 3 and showing the arrangement for holding the spring.

Fig. 5 is a detail plan view of the spring seat and nut.

There is shown a vehicle body A supported by wheel units, only one of which is shown. The wheel unit consists of a pair of successively arranged wheels 5—5, each wheel having its axis 6 mounted in the extremities of a set of spaced arms 7—7. The sets of arms for the wheels are journaled independently of each other on a support shaft 8 (Figs. 2 and 3) carried by and projecting laterally from the body A. The sets of arms are associated through a linkage consisting of spaced bars 9—9 (Fig. 1) overlying the shaft 8 and having their ends coupled to intermediate portions of the arms 7 by parallel links 10—10.

The bars 9 are centrally journaled on bushings 11—11 on opposite ends of a guide block 12 which is positioned above and parallel to the support shaft 8. The guide block 12 has a centrally and vertically disposed squared aperture 13 which is in line with a round aperture 14 in the support shaft 8 and with a squared aperture 15 in a bracket 16. The bracket is formed on a plate 17 which is secured to the body A by bolts 18 and which preferably includes the bearing 19 for the support shaft 8. A guide rod 20 having a squared portion disposed in the apertures 13 and 15 and a round portion disposed in the aperture 14 is provided with a shoulder 21 engaging the upper face of the support shaft 8. A nut 22 is threaded on the lower end of the round portion of the rod and when it engages the lower face of the support shaft the rod is securely held in place.

A volute spring 23 having its outer coil seated on the bracket 16 and its inner coil engaging a seat 24 resting on the guide 12 provides a yielding suspension between the body and the wheel unit. The seat 24 has a squared aperture 25 for the guide rod 20 which holds it against lateral displacement.

The squared walls of the aperture 25 are provided with interrupted threads 26—26 so that the seat may be used as a nut to cooperate with a threaded rod 27 as shown in Fig. 4 during assembly and disassembly of the unit. The rod 27 temporarily replaces the guide rod 20 and is inserted through the aperture 15 in the bracket. The substitution is accomplished without affecting the spring. The rod 27 has a non-circular head 28 whereby it may be held against rotation and carries a nut 29 which bears against the bracket. Upon turning the nut the rod 27 is moved axially in either direction to move the seat 24 and the spring 23 and permit application or removal of the wheel unit. When the wheel unit is in place the rod 27 is replaced by the guide rod 20.

The outer side of the spring and guide assembly is closed by a plate 30 which is bolted to the bracket 16 and is mounted on the support shaft 8. The plate 30 carries a rubbing plate 31 and a similar rubbing plate 32 is secured to the inside plate 17 of the bracket.

In operation the arms 7 carrying the wheels 5 move independently of each other and relative to the body A to compress the spring 23. This movement is transmitted directly to the spring by the guide block 12 which is capable of moving on the guide rod 20. The guide rod being squared, prevents twisting of the guide and the associated linkage.

We claim:

1. In a suspension for vehicles, a member to be supported, a shaft carried by said member and projecting laterally therefrom, a pair of arms journaled on the shaft independently of one another, a wheel on each arm, a linkage connecting intermediate portions of the arms, a guide block on the linkage and having a square aperture, a bracket on the supported member and having a square aperture, a guide rod carried by the shaft and extending through the square apertures of the guide block and bracket, and a spring confined between the guide block and the bracket.

2. In a suspension for vehicles, a member to be supported, a shaft carried by said member and projecting laterally therefrom, a pair of arms journaled on the shaft independently of one another, a wheel on each arm, a linkage connecting intermediate portions of the arms, a guide block on the linkage and having an aperture, a bracket on the supported member and having an aperture, a guide rod carried by the shaft and extending through the apertures of the guide block and bracket, and a spring confined between the guide block and the bracket.

3. In a suspension for vehicles, a member to be supported, a pair of arms mounted on said member independently of one another, a wheel on each arm, a linkage connecting intermediate portions of the arms and including a guide block, a guide rod carried by the member to be supported passing through the guide block, and a yielding connection between the guide block and the member to be supported.

4. In a suspension for vehicles, a member to be supported, a wheel unit movably mounted on said member and including a guide block, a spring seat normally resting on the guide block and having a threaded aperture whereby it may be seized and held independently of the guide block, a guide rod carried by the member to be supported and passing through the guide block and the threaded aperture of the spring seat and a yielding connection between the spring seat and the member to be supported.

5. In a suspension for vehicles, a member to be supported, a wheel unit movably mounted on said member and including a guide block, a spring seat normally resting on the guide block and having means whereby it may be seized and held when the guide block is removed, a guide rod carried by the member to be supported and passing through the guide block and spring seat and a yielding connection between the spring seat and the member to be supported.

HARRY A. KNOX.
THOMAS HAY NIXON.